(12) United States Patent
Neystadt (10) Patent No.: US 10,904,989 B2
(45) Date of Patent: Jan. 26, 2021

(54) LIGHT ANIMATION SERVICE

(71) Applicant: Arm Limited, Cambridge (GB)

(72) Inventor: John Eugene Neystadt, Kfar-Saba (IL)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/028,368

(22) Filed: Jul. 5, 2018

(65) Prior Publication Data

US 2019/0014648 A1 Jan. 10, 2019

(30) Foreign Application Priority Data

Jul. 6, 2017 (GB) .................................. 1710864.8

(51) Int. Cl.
| | | |
|---|---|---|
| G05B 15/02 | (2006.01) | |
| H05B 33/08 | (2020.01) | |
| H05B 37/02 | (2006.01) | |
| H05B 47/19 | (2020.01) | |
| H05B 45/20 | (2020.01) | |
| H05B 47/18 | (2020.01) | |

(52) U.S. Cl.
CPC .............. *H05B 47/19* (2020.01); *G05B 15/02* (2013.01); *H05B 45/20* (2020.01); *H05B 47/18* (2020.01)

(58) Field of Classification Search
None
See application file for complete search history.

(56) References Cited

U.S. PATENT DOCUMENTS

| | | | | |
|---|---|---|---|---|
| 7,202,613 B2 * | 4/2007 | Morgan | ................. | H05B 45/10 |
| | | | | 315/312 |
| 7,309,965 B2 * | 12/2007 | Dowling | ................... | F21S 2/00 |
| | | | | 315/318 |
| 8,829,821 B2 * | 9/2014 | Chobot | ................. | H05B 47/155 |
| | | | | 315/312 |
| 8,912,735 B2 * | 12/2014 | Chobot | .................. | H05B 45/00 |
| | | | | 315/312 |
| 8,964,674 B2 * | 2/2015 | Han | ...................... | H04L 1/1861 |
| | | | | 370/329 |
| 9,713,229 B2 * | 7/2017 | Tanigawa | ............. | H05B 47/105 |
| 10,154,569 B2 * | 12/2018 | Harris | .................. | H05B 47/185 |
| 10,172,218 B2 * | 1/2019 | Motley | .................. | H05B 45/37 |
| 10,342,105 B2 * | 7/2019 | Harris | ..................... | H05B 47/19 |

(Continued)

FOREIGN PATENT DOCUMENTS

| | | |
|---|---|---|
| WO | 2002-101702 A2 | 12/2002 |
| WO | 2016-044123 A1 | 3/2016 |

OTHER PUBLICATIONS

UKIPO Examination and Search Report; GB 1710864.8; dated Dec. 12, 2017.

*Primary Examiner* — Amy Cohen Johnson
*Assistant Examiner* — Srinivas Sathiraju
(74) *Attorney, Agent, or Firm* — Pramudji Law Group PLLC; Ari Pramudji (57) ABSTRACT

There is described a method, system and computer program product for a network of two or more connected light emitting network devices, the method comprising: discovering the light emitting network devices; discovering associated light emitting network device locations; discovering associated light emitting network device controls for controlling each light emitting network device; and providing a control interface for controlling one or more light emitting network devices with an instruction referencing one or more light emitting network device locations.

18 Claims, 6 Drawing Sheets

(56) References Cited

U.S. PATENT DOCUMENTS

| | | | | |
|---|---|---|---|---|
| 10,342,106 B1* | 7/2019 | Chen | | H05B 45/10 |
| 10,349,494 B2* | 7/2019 | Vangeel | | H04L 12/2825 |
| 10,455,656 B2* | 10/2019 | Clout | | H05B 47/19 |
| 2003/0222587 A1* | 12/2003 | Dowling, Jr. | | H05B 47/19 |
| | | | | 315/149 |
| 2004/0160199 A1* | 8/2004 | Morgan | | A01M 1/04 |
| | | | | 315/312 |
| 2007/0145915 A1* | 6/2007 | Roberge | | F21K 9/00 |
| | | | | 315/312 |
| 2011/0130851 A1* | 6/2011 | Ferstl | | H05B 47/18 |
| | | | | 700/90 |
| 2012/0209832 A1* | 8/2012 | Neystadt | | G06Q 50/01 |
| | | | | 707/723 |
| 2012/0210240 A1* | 8/2012 | Neystadt | | G06Q 30/0282 |
| | | | | 715/739 |
| 2013/0038307 A1* | 2/2013 | Saito | | H02M 3/335 |
| | | | | 323/283 |
| 2013/0085844 A1* | 4/2013 | Neystadt | | G06Q 30/02 |
| | | | | 705/14.49 |
| 2013/0111315 A1* | 5/2013 | Mendelovich | | G06F 40/18 |
| | | | | 715/205 |
| 2014/0354161 A1* | 12/2014 | Aggarwal | | H05B 47/105 |
| | | | | 315/153 |
| 2015/0084514 A1* | 3/2015 | Anthony | | H05B 47/175 |
| | | | | 315/131 |
| 2016/0338170 A1* | 11/2016 | Lebel | | H05B 47/19 |
| 2017/0123390 A1* | 5/2017 | Barco | | H05B 47/19 |
| 2017/0230500 A1* | 8/2017 | Serna Pozuelo | | H04M 3/42153 |
| 2017/0325112 A1* | 11/2017 | Neystadt | | H04W 24/08 |
| 2018/0074933 A1* | 3/2018 | Neystadt | | G06F 11/0745 |
| 2018/0227332 A1* | 8/2018 | Neystadt | | H04L 65/1053 |
| 2018/0228006 A1* | 8/2018 | Baker | | H05B 47/105 |
| 2019/0014648 A1* | 1/2019 | Neystadt | | H05B 47/18 |
| 2019/0029088 A1* | 1/2019 | Clout | | H05B 45/00 |

* cited by examiner

Mapping Tool B

- Network Light Discovery Engine 202
- Location Discovery Engine 204
- Control Discover Engine 206

FIGURE 2A

Light Animation Service E

- Light Matrix Builder 208
- Network Light Interface 210
- Light Animation Method 300

| Light Matrix 7 | | |
|---|---|---|
| Bulb | Location (Longitude (Long.), Latitude (Lat.), Elevation(Elv.)) | Capability (Temperatures) |
| C1 | Long.=32.29<br>Lat.=34.82<br>Elv.=8.34m | 2200K |
| C2 | Long.=32.29<br>Lat.=34.82<br>Elv.=9.34m | 2700K |
| C3 | Long.=32.29<br>Lat.=34.82<br>Elv.=10.34m | 3200K |

FIGURE 5

LIGHT ANIMATION SERVICE

BACKGROUND OF THE INVENTION

The present techniques relate to a light animation service.

Connected lighting is used in smart office buildings and in smart street lighting, enabling control of each light remotely over a network. Such connected lighting enables building owners or municipalities to run colour animation on connected lights during festivities, or special events, enabling branding, advertising and customer welcoming, and other marketing activities.

BRIEF SUMMARY OF THE INVENTION

According to a first technique, there is provided a method for a network of two or more connected light emitting network devices, the method comprising: discovering the light emitting network devices; discovering associated light emitting network device locations; discovering associated light emitting network device controls for controlling each light emitting network device; and providing a control interface for controlling one or more light emitting network devices with an instruction referencing one or more light emitting network device locations According to a second technique, there is provided a system, for controlling a network of two or more connected light emitting network devices, the system comprising: a network light discovery engine for discovering the light emitting network devices; a location discovery engine for discovering associated light emitting network device locations; a control discovery engine for discovering associated light emitting network device controls for controlling each light emitting network device; and a control interface for controlling one or more light emitting network devices with an instruction referencing one or more light emitting network device locations.

According to a third technique, there is provided a computer program product for a network of two or more connected light emitting network devices, the computer program product comprising a computer readable storage medium having program instructions embodied therewith, the program instructions executable by a processor to cause the processor to: discover light emitting network devices in the network; discover light emitting network device locations associated with the discovered light emitting network devices; discover associated light emitting network device controls for controlling each light emitting network device; and provide a control interface for controlling one or more light emitting network devices with an instruction referencing one or more light emitting network device locations.

BRIEF DESCRIPTION OF THE DRAWING

Embodiments will be described with reference to the accompanying figures of which.

DETAILED DESCRIPTION

Figure 1A:
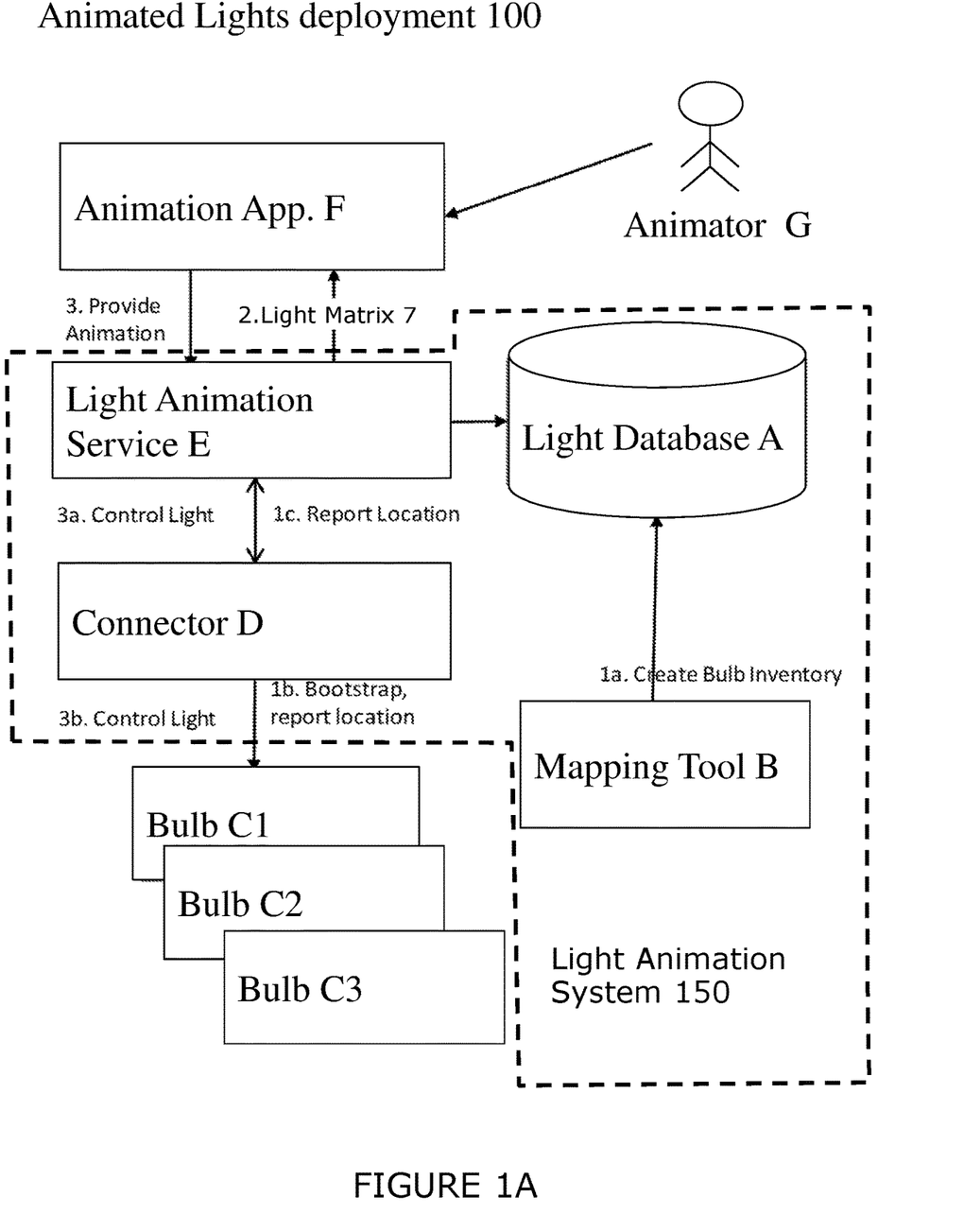
FIG. 1A is a deployment diagram of a present embodiment.

Referring to FIG. 1A, an animated lights deployment 100 according to a present embodiment includes the following components: light database A; mapping tool B; light emitting network devices (bulbs C1, C2, C3); connector D; light animation service E; animation application F; and an animator G. In the present embodiment, a collection of the components comprising: light database A; mapping tool B; connector D; and light animation service E, are hosted on a computing platform, in this example light animation system 150. In other embodiments, each component can be hosted on an individual computing platform or together on a platform with one of the deployment components.

Light animation database A comprises an inventory of light emitting network devices to map each of light emitting network device locations and capabilities, for example, colour temperature and dynamic colour range.

Mapping tool B is for discovering the light emitting network devices, their locations, and their capabilities. Mapping tool B uses network communications to ask individual light emitting network devices about themselves. Mapping tool B can also measure light position, intensity, and colour for verifying or calculating light location and capability.

Light emitting network devices (bulbs C1, C2 and C3 collectively known as C) are lights having network capabilities and additionally network discovery capabilities.

Connector D is for connecting light animation service E to bulbs C.

Light animation service E is for controlling the discovery and then for individual detailed control of the bulbs. Light animation service E is for providing a light matrix of elements representing lights and their relative or absolute locations. The light matrix is for mapping against an image frame for use in controlling the network of light bulbs such that an image frame be represented a light matrix to control a light display to render the image frame. Light animation service E is also for: turning each light bulb on or off; and setting colour values at scheduled times for each bulb.

Animation application F is for rendering geometry for animation and for mapping animation frames produced by animation tools against the light matrix to calculate value of each light bulb in each frame. Animation application F is also for using multiple light animation sources, to enable video displaying on multiple buildings on the same street, creating wide effect viewable from streets or air. Animation application F is also for live video streaming support, when video is rendering in real-time and each frame is scheduled with a jitter delay.

Animator G is for controlling a light display using images and animation application F. However, a user, with the right application interface could also control lights using the light animation service E or connector D.

The interactions 1a, 1b, 1c, 2, 3, 3a and 3b are described with reference to the example in FIG. 5.

Figure 1B:
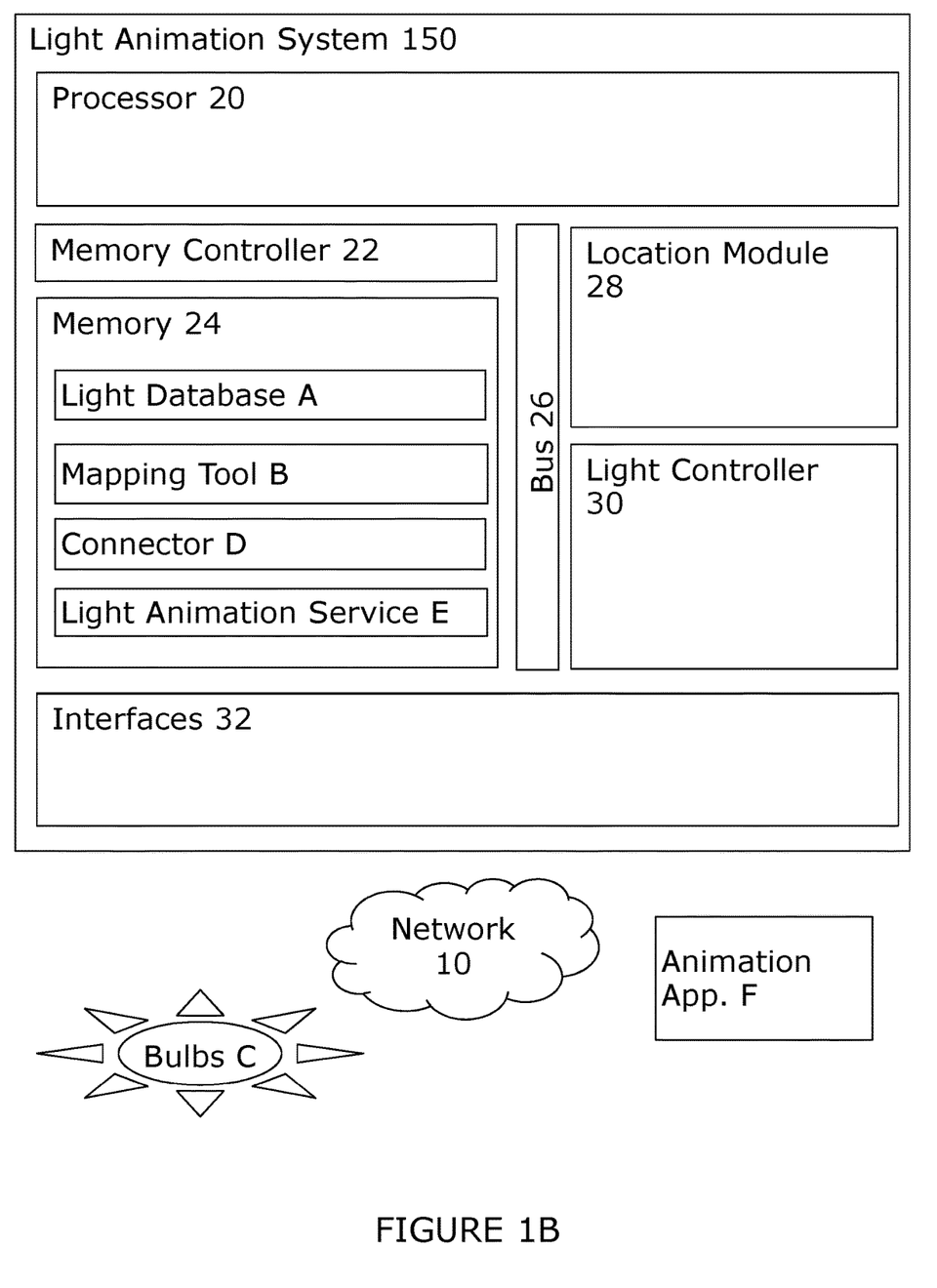
FIG. 1B is a component diagram of the present embodiment.

Referring to FIG. 1B, example computer implemented light animation system 150 is described. Light animation system 150 is operational with numerous other general purpose or special purpose computing system environments or configurations. Examples of well-known computing processing systems, environments, and/or configurations that may be suitable for use with light animation system 150 include, but are not limited to, gateways, routers, personal computer systems, server computer systems, thin clients, thick clients, hand-held or laptop devices, multiprocessor systems, microprocessor-based systems, set top boxes, programmable consumer electronics (smartphones, smart watches, tablets), network PCs, minicomputer systems, mainframe computer systems, and distributed computing environments that include any of the above systems or devices.

Light animation system 150 may be described in the general context of a computer system or a computer system on a chip (SoC). Such a computer system comprises executable instructions, such as program modules, being executed by a computer processor. Generally, program modules may include: routines; programs; objects; components; logic; and data structures that perform tasks or implement abstract data types.

Light animation system 150 is connected through a wide area network (WAN) 10 to light bulbs C and animation application F. Any other type of network can be used including a low power wireless network. Network 10 can be the Internet or a private network.

Light animation system 150 comprises: processor 20; memory controller 22; memory 24; bus 26; location module 28; light controller 30; and interfaces 32.

Processor 20 is for loading machine instructions from device memory (for example) and for performing machine operations in response to the machine instructions. Such machine operations include: performing an operation on a value in a register (for example arithmetical or logical operations); moving a value from a register to a memory location directly and vice versa; and conditional or non-conditional branching. A typical processor can perform many different machine operations. The machine instructions are written in a machine code language which is referred to as a low-level computer language. A computer program written in a high-level computer language (also known as source code) needs to be compiled to a machine code program (also known as object code) before it can be executed by the processor. Alternatively, a machine code program such as a virtual machine or an interpreter can interpret a high-level language (such as C) in terms of machine operations.

Memory controller 22 is for reading and writing values from memory 20.

Memory 24 is for storing data and instruction modules in dynamic and/or persistent electronic memory cells (for example random access memory and/or and flash memory). In the embodiment of the light animation system, memory 24 comprises instruction modules. Such instruction modules include: light database A; mapping tool B; connector D; and light animation service E. Other modules not shown include firmware module and operating system module.

Bus 26 is a fast communication route between all the key components of the system.

Location module 28 is a hardware module for determining the location of the light animation system from location services such a global satellite positioning service. Location module 28 is also for determining the location of a light source using triangulation and remote detectors.

Light controller 30 is a hardware module for controlling the bulbs C.

Interfaces 32 are for providing communication channels to the light bulbs and animation application F using network 10 or some other network or connection.

Figure 2A:
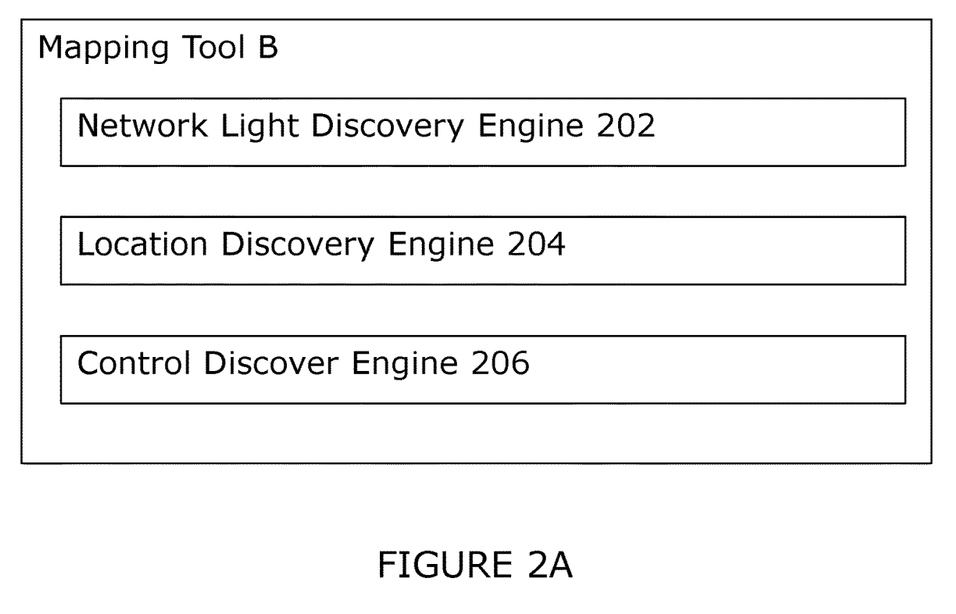
FIGS. 2A and 2B are further component diagrams of the present embodiment.
Figure 2B:
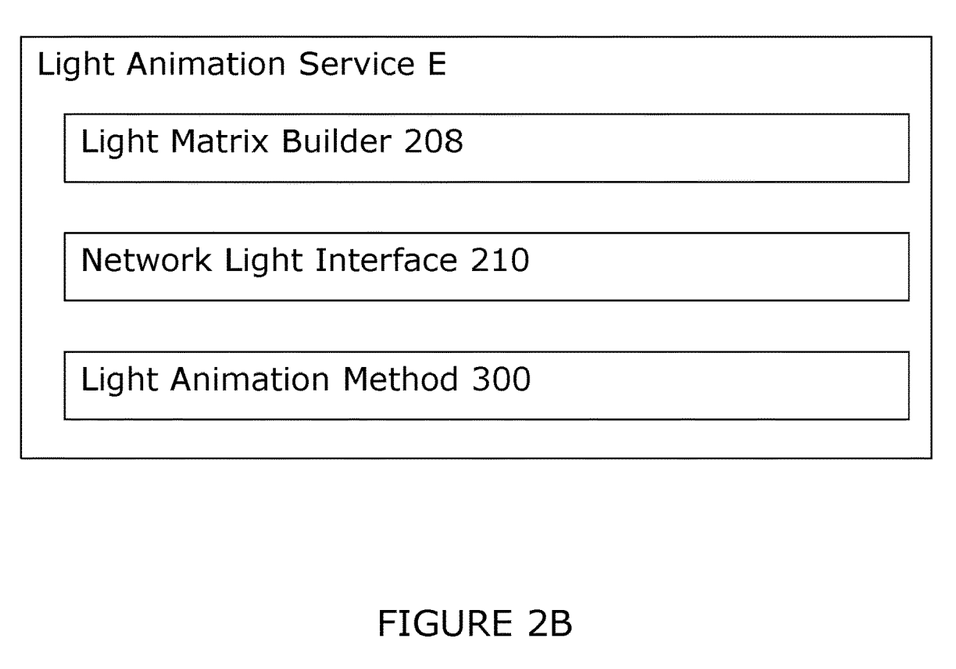

Referring to FIGS. 2A and 2B, sub-components of mapping tool B and light animation service E are described in more detail. In other embodiments, these sub-components may be located together in the same component and platform or located in different components and different platforms.

Referring to FIG. 2A, mapping tool B comprises: network light discovery engine 202; location discovery engine 204; and control discovery engine 206.

Referring to FIG. 2B, light animation service E comprises: light matrix builder 208; network light interface 210; and light animation method 300.

Network light discovery engine 202 is for discovering light emitting network devices in the network by querying network devices to located light emitting network devices and other networks of light emitting network devices.

Location discovery engine 204 is for querying a light emitting network device to discover location information from the light emitting network device.

Control discovery engine 206 is for querying a light emitting network device to discovery information about how to control the light emitting network device.

Light matrix builder 208 is for building a data structure, such as a matrix, that contains information on light emitting network devices, location and capability that can be used to map a light display from an image.

Network light interface 210 provides an instruction interface for use by a entity (such as animation application F) to control the discovered light emitting network devices, as defined in the light matrix.

Light animation method 300 is the method for controlling present embodiment.

Figure 3:
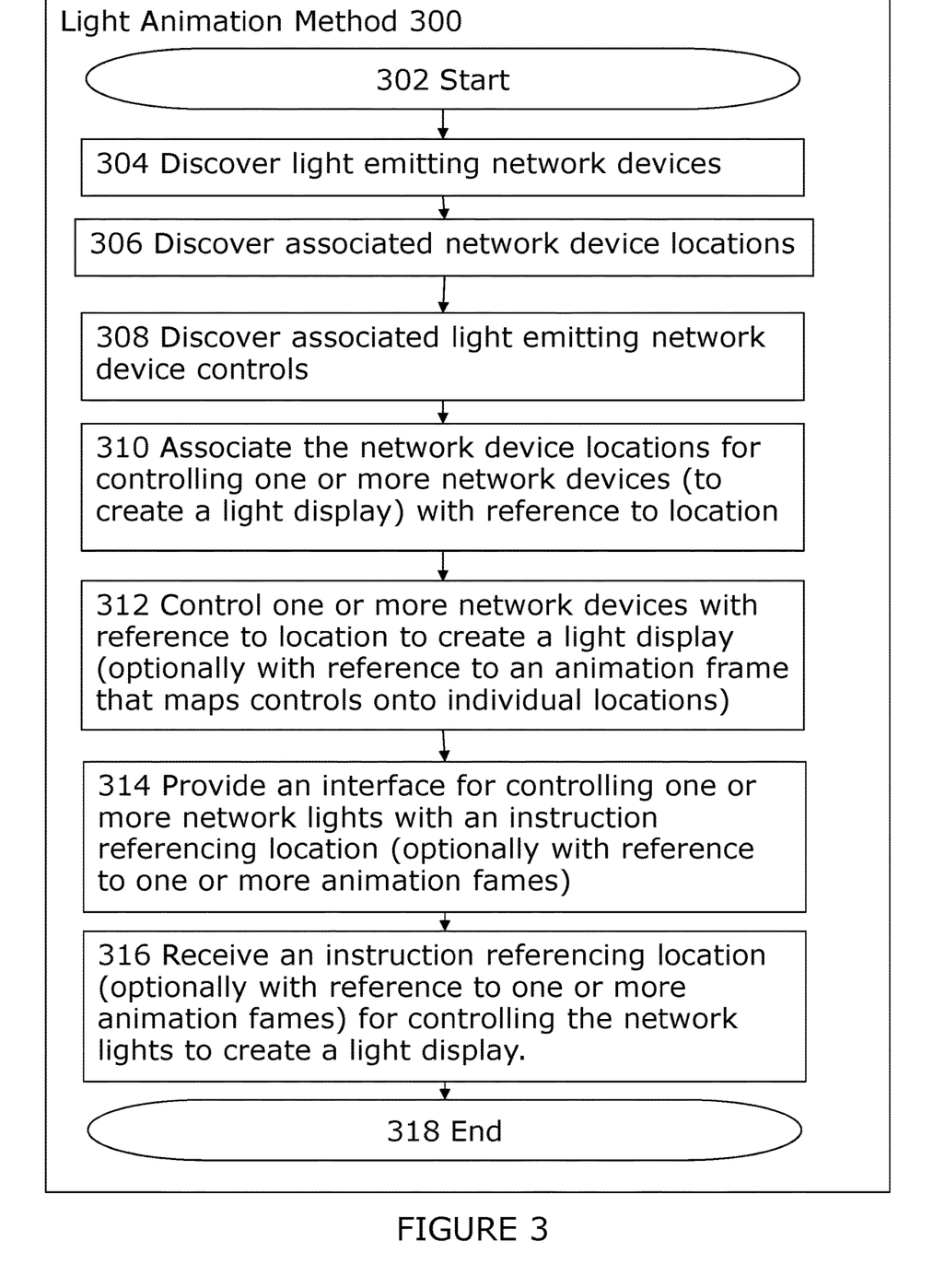
FIG. 3 is a method diagram of the present embodiment.

Referring to FIG. 3, light animation method 300 is described with respect to logical process steps 302 to 318 (also known as instruction steps) in a network of two or more connected light emitting network devices. Although there is an order to the preferred embodiment steps as described, the steps may not necessarily need to be in this order unless specified and, in other embodiments, the logical process steps can be in a different order.

Step 302 is the start of the method when initiated by the animation application F or a user.

Step 304 is for discovering light emitting network devices in the network. Discovering the light bulbs including discovering light bulb capabilities including colour capability. Colour capability includes colour temperature and dynamic colour range. Discovering light emitting network devices further comprises discovering light emitting network devices on one or more further light emitting network device networks.

Step 306 is for discovering associated light emitting network device locations. Location is in three-dimensional space but a location can include a range of locations where the light emitting network device bulb has freedom of movement. Furthermore, a location can include a time dimension if one or more of the network bulbs are moving with respect to each other or a fixed point. Discovering associated light emitting network device locations further comprises discovering light emitting network device locations on one or more further networks.

Step 308 is for discovering associated light emitting network device controls for controlling each light emitting network device. Discovering associated light emitting network device controls includes on one or more further networks.

Step 310 is for associating the light emitting network device locations for controlling one or more light emitting network devices (to create a light display) with reference to location.

Step 312 is for controlling one or more light emitting network devices with one or more location references to create a light display. Controlling a light emitting network device includes controlling one or more of: turning on; turning off or into a standby mode; brightness; colour; direction; beam angle; or position if the light emitting network device is moveable. Optionally, step 312 is for controlling two or more light emitting network devices with an animation frame comprising a plurality of location references. Controlling one or more light emitting network devices includes controlling the light emitting network devices on the combined networks using a super animation frame associated with a combined light emitting network device space thereby creating a combined super light emitting network device display.

Step 314 is for providing an interface for controlling one or more light emitting network devices with an instruction including a location reference. Step 314 is also for providing an interface for controlling one or more light emitting network devices with an instruction including a frame comprising a plurality of location references. Step 314 is also for providing an interface for controlling one or more light emitting network devices with two or more animation frames over time.

Step 316 is for receiving an instruction including a location reference and controlling one or more light emitting network devices to create a light display. Step 316 is also for receiving an instruction including one or more frame, each frame comprising a plurality of location references.

Step 318 is the end of light animation method 300.

Figure 4:
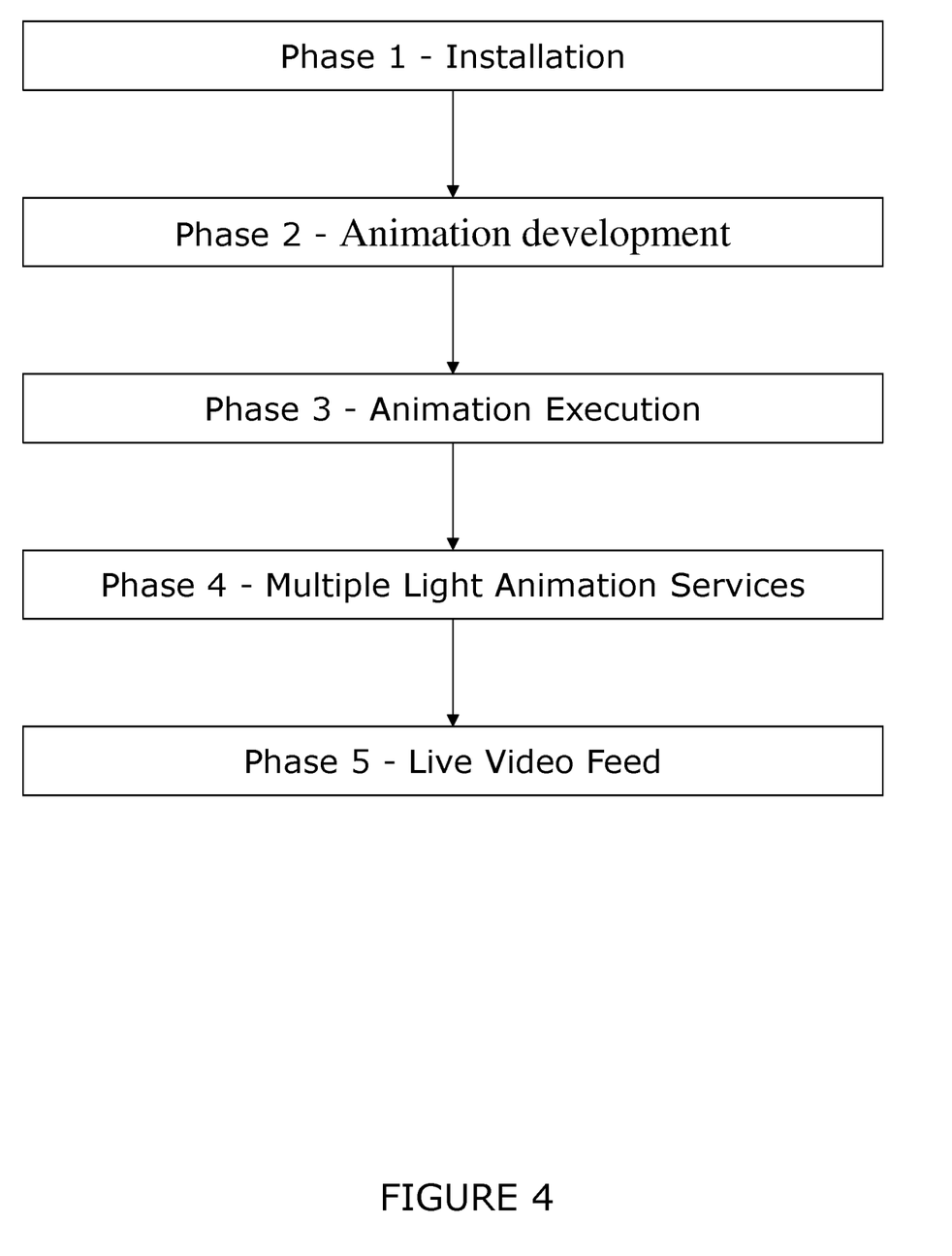
FIG. 4 is an example phase diagram of the present embodiment.

Referring to FIG. 4, an example of the embodiments comprises five phases of operation: phase 1—installation; phase 2—animation development; phase 3—animation execution; phase 4—multiple light animation services; and phase 5—live video feed. This example also refers to FIG. 1A for example interactions 1a, 1b, 1c, 2, 3, 3a and 3b. The phases may be consecutive and/or iterative.

Phase 1—Installation. During installation phase, a light inventory is built by mapping tool B and saved (interaction 1a) to light database A. For each light, bulb id, three-dimensional location, and colour capabilities must be discovered or estimated. Each connected bulb C, when installed reports (interactions 1b and 1c) bulb id, characteristics, including colour capabilities as supported by its hardware, and location, which is acquired from global positioning system (GPS), indoor positioning system (IPS) or a manual geodesic measurement via network protocol via connector D to light animation service E which then stores information about each bulb in light database A. If a bulb C has no knowledge of its location, then standalone mapping tool B (which can run separately on a smartphone or other mobile computing device) can be used to determine each bulb location (by measuring light location, intensity and colour directly with sensors), and amend the registration information in the light database A, indicating bulb-id. Information on direction of the bulb need to be recorded in case the bulb belongs for example to an internal room and is not visible from outside, thus being not useful for the animation. A possible method to implement is to use multiple cameras positioned in a way that they can capture multiple lights, turned the lights one by one, triangulate bulb their positions and capabilities, based on differences seen by each camera and record identified bulb positions in the inventory.

Phase 2—animation development. Animator G uses animation application F to survey the light matrix geometry available for a given building or city. Animation application F retrieves light matrix 7 (interaction 2) from light animation service E, which queries light database A for it. Animation application F then generates a three-dimensional geometry of the light matrix elements based on the light inventory in light database A in one of the formats supported by regular animation software. Animator G provides animation in one of the common animation formats, which can include moving text, three-dimensional lighting effects, moving shapes or raster rendering. Animator G uses animation application F to render (interaction 3) the animation on a subset of the geometry of interest and a set of frames, with values for each bulb at each time interval. For example, a single street out of the city, or floors 3-5 of building.

Phase 3—animation execution. Animator G uses animation application F to send (interaction 3) the rendered animation to light animation service E, and timing information (beginning time, end time, number of loops), which stores the animation and schedules a timer for execution start. Once a timer is triggered, and time comes, then light animation service E takes each rasterized frame from the rendered animation and iterates over the light matrix. Matrix elements control turning on-off or setting a colour value of individual bulbs C. The commands to change bulb value are then sent (interactions 3a, 3b) via connector D to each of the bulbs C. Light animation service E then schedules a timer for next frame and repeats interactions 3a and 3b until completion of the animation. After rendering last frame, light animation service E can restart the animation from the first frame, according to animation information and loop a configured number of times, or until a specific time. Multiple animations can be scheduled at the same time over same set of lights, in different regions, for examples, building floors or streets. Light animations service E needs to detect that frames from different concurrent animations executed affect same bulb and choose the value from one of them only, according to configured logic. The logic should be based on either explicit ordering specified by animation application F, such as order of animations scheduling received.

Phase 4—multiple light animation services. Animations are run over multiple light animation services E, for example to have multiple buildings in front of high way to show coordinated animation. Animation application F can be configured with multiple light animation services E and will provide interaction 2 and 3 above for a group of such services by: retrieving the geometry (light matrix 7) from each of the sources and combining it into a single geometry (a super matrix). When rendering the animation include for each dot bulb id and light animation source id, producing separate renderings for each of the light animation services E. Sending (3a) corresponding rendered animation for each of the light animation services E. Scheduling identical beginning times, end times and loop configurations for each of the light animation services E.

Phase 5—live video feed. Animation application F can provide a live video feed conversion to project video from camera or network source (for example from an Internet live video service). To do so, animation application F will be configured with a live feed using streaming video. Animation application F will introduce a configurable jitter delay (for example, one second) to have time to receive render and send the frame to each of the bulbs. Animation application F will render each frame and sending (3) each rendered frame immediately to light animation service E in real time, calculating a scheduled execution time according to jitter delay calculation, enabling smooth video execution by each bulb C at one or more light animation services E.

Figure 5:
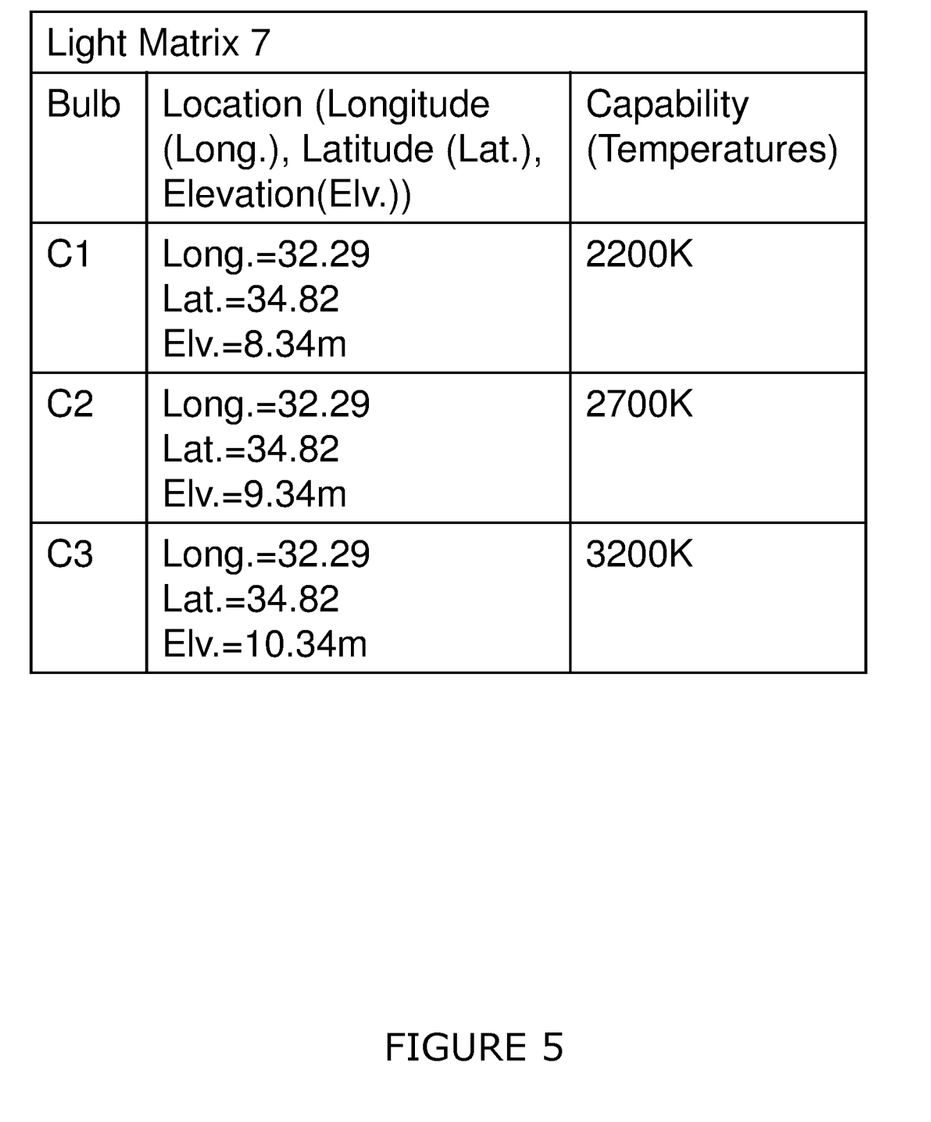
FIG. 5 is a schematic example of a light matrix of the present embodiment.

Referring to FIG. 5, an example of light matrix 7 is described. In the present embodiment, light matrix 7 comprises a table with three columns: bulb; location; and capability. In the present embodiment, details including light emitting network device controls are not passed through with the light matrix. In this example, bulb is represented with a simple id and three bulbs are shown (bulbs C1-C3).

In this example, location is represented by longitude, latitude and elevation metres. Bulb C1 is 32.29 m longitude, 34.82 m latitude and 8.34 m elevation. Bulb C2 is 32.29 m longitude, 34.82 m latitude and 9.34 m elevation. Bulb C3 is 32.29 m longitude, 34.82 m latitude and 10.34 m elevation. Therefore the bulbs are in a line, bulb C2 is 1 m away from bulb C1, bulb C3 is 1 m away from bulb C2.

In this example, capability is represented by colour temperature. Bulb C1 is a 2200K bulb; bulb C2 is a 2700K bulb; and bulb C3 is a 3200K bulb.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

The invention claimed is:

1. A method for controlling two or more light emitting network devices, the method comprising:
    discovering, using a mapping tool, the light emitting network devices by using network communications to query network devices to locate light emitting network devices on one or more light emitting network device networks;
    discovering, using the mapping tool, associated light emitting network device locations by using the network communications to query the discovered light emitting network devices to discover location information for the light emitting network devices and to receive the location information from the light emitting network devices via the network communications;
    discovering, using the mapping tool, associated light emitting network device controls for controlling each light emitting network device by using the network communications to query the light emitting network devices to discover the associated light emitting network device controls and to receive the light emitting network device controls from the light emitting network devices via the network communications; and
    providing an interface for controlling one or more light emitting network devices with an instruction referencing one or more light emitting network device locations.

2. The method according to claim 1, further comprising:
    controlling one or more light emitting network devices with reference to their location.

3. The method according to claim 1, wherein controlling one or more light emitting network devices is for creating a light display.

4. The method according to claim 1, wherein controlling one or more light emitting network devices includes controlling one or more of: turning on; turning off or into a standby mode; brightness; colour; direction; beam angle; or position if the light emitting network devices is moveable.

5. The method according to claim 1, further comprising:
    controlling one or more light emitting network devices with reference to each light emitting network device location and the relative location of each pixel or group of pixels in an image for creating a light display representative of the image.

6. The method according to claim 1, further comprising: extracting a three-dimensional matrix of elements from the locations of the light emitting network devices whereby each matrix element is mapped from a corresponding light emitting network device location or locations.

7. The method according to claim 1, further comprising: controlling two or more light emitting network devices using an instruction referencing a matrix of elements whereby each matrix element maps onto an individual light.

8. The method according to claim 1, further comprising: discovering light bulb network device capabilities including colour capability.

9. The method according to claim 8, wherein colour capability includes colour temperature and dynamic colour range.

10. The method according to claim 1, wherein location is in three-dimensional space.

11. The method according to claim 10, wherein location further includes a range of locations where the light emitting network device has freedom of movement.

12. The method according to claim 10, wherein location further includes time dimension if one or more of the light emitting network device are moving with respect to each other or a fixed point.

13. The method according to claim 1, further comprising: controlling the light emitting network devices over time using a sequence of instructions or matrix instructions over time.

14. The method according to claim 1, further comprising: an animation application for transforming an image frame or sequence of image frames into one or more instructions referencing the locations of the light emitting network devices for creating a light display representative of the image frame or image frames.

15. The method according to claim 14, wherein the image frames are derived from a live video feed.

16. The method according claim 1, further comprising:
discovering light emitting network devices, light emitting network device controls and light emitting network device locations on one or more further networks;
controlling the light emitting network devices on all the discovered networks using one or more unified instructions associated with a combined light emitting network device space thereby creating a combined light emitting network device display representative of an image, image frame or image frames.

17. A system, for controlling two or more connected light emitting network devices, the system comprising:
a mapping tool for using network communications to discover light emitting network devices, their locations, and their capabilities, the mapping tool comprising:
a network light discovery engine for discovering the light emitting network devices by querying network devices to locate the light emitting network devices on one or more light emitting network device networks;
a location discovery engine to query the discovered light emitting network devices to discover location information for the light emitting network devices and to receive the location information from the light emitting network devices via the network communications;
a control discovery engine to query the light emitting network devices to discover associated light emitting network device controls for controlling each light emitting network device and to receive the light emitting network device controls from the light emitting network devices via the network communications; and
a control interface for controlling one or more light emitting network devices with an instruction referencing one or more light emitting network device locations.

18. A computer program product for controlling two or more connected light emitting network devices, the computer program product comprising a computer readable storage medium having program instructions embodied therewith, the program instructions executable by a processor to cause the processor to:
discover, using a mapping tool, the light emitting network devices in the network by using network communications to query network devices to locate the light emitting network devices on one or more light emitting network device networks;
discover, using the mapping tool, light emitting network device locations associated with the discovered light emitting network devices by using the network communications to query the discovered light emitting network devices to discover location information for the light emitting network devices and to receive the location information from the light emitting network devices via the network communications;
discover, using the mapping tool associated light emitting network device controls for controlling each light emitting network device by using the network communications to query the light emitting network devices to discover the associated light emitting network device controls and to receive the light emitting network device controls from the light emitting network devices via the network communications; and
providing a control interface for controlling one or more light emitting network devices with an instruction referencing one or more light emitting network device locations.

* * * * *